INVENTORS.
JOHN B. CATALDO
ALBERT N. COOK
BY
Campbell, Brumbaugh, Free & Graves
THEIR ATTORNEYS.

Patented June 2, 1953

2,640,896

UNITED STATES PATENT OFFICE 2,640,896

THERMOSTAT DEVICE

John B. Cataldo, Bernardsville, and Albert N. Cook, Stirling, N. J., assignors to John B. Pierce Foundation, New York, N. Y., a corporation of New York Application March 16, 1950, Serial No. 149,948

3 Claims. (Cl. 200—137)

This invention relates to thermoresponsive devices and more particularly to thermostats having a high degree of sensitivity and a useful work output capable of direct control of heavy loads such, for example, as electrical switch apparatus in power circuits.

In the design of thermostats it is, in general, necessary to effect certain compromises between the operating and structural characteristics thereof. Ideally a thermostat affords a high degree of sensitivity coupled with a high useful work output, the overall size and mechanical complexity nevertheless being maintained within practical limits to facilitate economical manufacture and convenience of installation. To this end, it has been found that the design of thermostats, particularly those which control electrical circuits, may be simplified and otherwise improved by the use of monometallic snap spring members, which are adapted to snap forcefully and rapidly between two configurations of equilibrium once initiated by a preestablished, externally applied thrust, which thrust is generally provided by the heat sensing element.

It is, accordingly, one object of this invention to provide a thermostat which is particularly adapted for use in combination with simplified heat sensing elements having a small work output as compared to the work output of the thermostat.

It is another object of the invention to provide a thermostat combining robust structural characteristics with a high degree of sensitivity, which thermostat may be adapted for a wide variety of specialized uses.

It is another object of the invention to provide a thermostat particularly adapted for use as an immersion unit to control water temperatures, the design being such that the unit may be readily mounted in water tanks using standard pipe connections.

Figure 1:
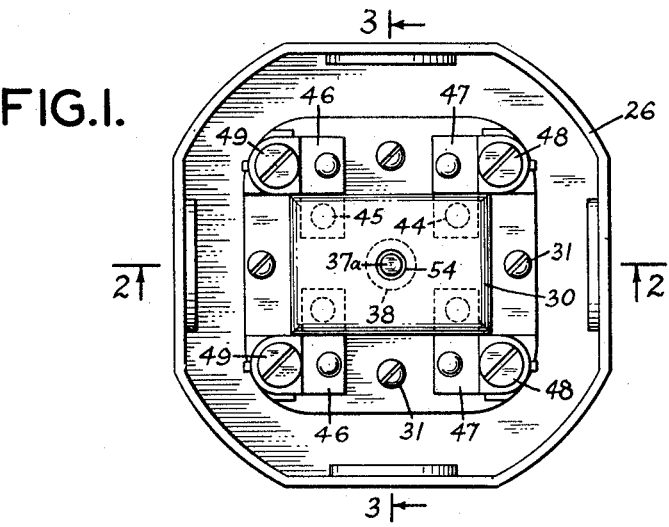
Figure 2:
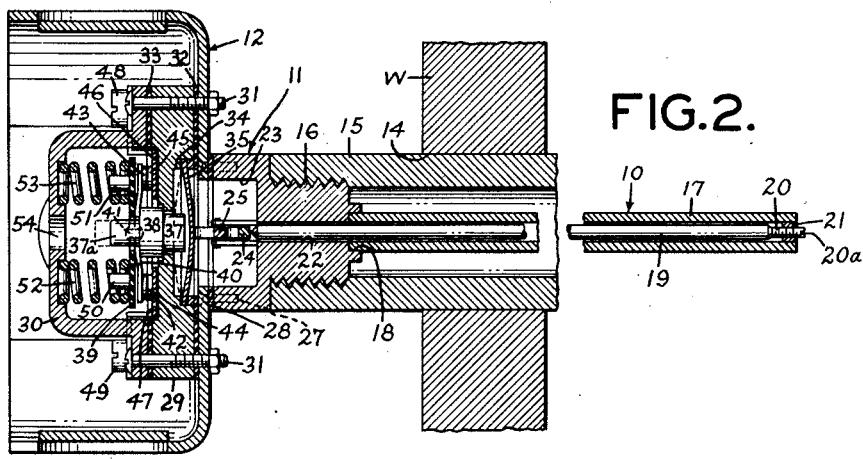
Figure 3:
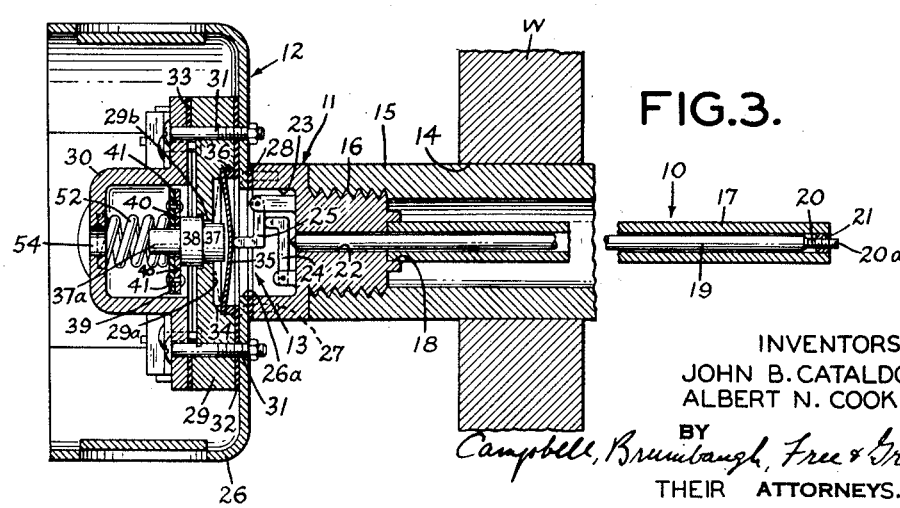

The above and other features of the invention may be more readily understood by reference to the accompanying drawings of a thermostat formed according to the invention in which Fig. 1 is an end view of a thermostat of the immersion type showing the junction box assembly;

Fig. 2 is a view in longitudinal cross-section of the thermostat formed by the plane containing the line 2—2 of Fig. 1, and Fig. 3 is a view in longitudinal cross-section of the thermostat as formed by the place containing the line 3—3 of Fig. 1.

Referring to Figs. 2 and 3 of the drawing, there is shown a thermostat of the immersion type including, broadly, an immersion tube 10 affixed at its inner end to a pipe fitting or adaptor 11, which in turn carries a junction box 12 containing certain electrical switch mechanism. Interposed between the junction box and the immersion tube is a motion-modifying driving linkage indicated generally at 13 (Fig. 3) whereby comparatively small movements of the heat-sensing means are amplified to provide forceful and enlarged movement suitable for operating the contacts of an electrical power circuit.

The illustrated unit is designed for use in water-heaters and the like, and to this end may be mounted by means of standard pipe connections in a convenient opening 14 in the wall W of a tank by means of a short length of pipe 15, which may be rolled, threaded or otherwise secured in the opening in the wall in the watertight joint. The outer end of the pipe 15 is internally threaded to receive a threaded shank 16 formed on the pipe fitting 11, with the immersion tube 10 projecting through the pipe and into the tank for a convenient distance to be enveloped by the water or other fluid medium therein.

The immersion tube 10 comprises an outer sleeve 17, formed of a material, such for example as Invar, having a low coefficient of thermal expansion within the range of operation of the thermostat. The sleeve 17 is supported at its inner end in a water-tight joint in a recess 18 formed in the shank of the pipe fitting 11. An elongated rod 19, formed of a material having a high coefficient of expansion relative to the sleeve 17, such as brass for example, is received within the sleeve 17 in a snug but sliding fit, the outer end of the rod being formed with a threaded tip 20 which screws into a tapped plug 21 rigidly secured in the free end of sleeve 17. The tip 20 may be formed with a screw-driver slot 20a to facilitate limited lengthwise adjustment of the brass rod within the sleeve.

The inner end of the brass rod passes through a central bore 22 formed in the shank of the pipe fitting 11 and enters an enlarged cavity 23 also formed in the pipe fitting. A pair of cooperating lever arms 24 and 25 are pivotally mounted within the cavity, with the edge of the lever 24 being engaged by the nose end of the brass rod 19 to provide a motion-modifying linkage which amplifies expansion movement of the brass rod by a factor of 10, the output of the linkage being taken off at the tip of the lever 25.

The junction box 12, comprising a cup-shaped shell portion 26 formed with an opening 26a adjacent the mouth of the cavity 13, is secured to the pipe fitting 11 by means of three flat-headed screws 27, with a gasket 28 interposed therebetween. A plate member 29, formed with a cavity 29a and a central bore 29b, is bolted together with a domed cap member 30 to the shell 26 by means of four through-bolts 31, with gaskets 32 and 33 being interposed between contiguous surfaces of the shell and plate and plate and cap respectively.

Mounted within the cavity 29a is a monometallic snap disc spring 35 peripherally loosely confined between an annular shoulder 34 and a washer 36. The snap disc 35 is thus mounted so that its central portion may partake of snap movement between either of two configurations of equilibrium as shown in full and broken lines in Figs. 2 or 3. Snap discs of the type contemplated herein may be formed according to disclosures in the following pending U. S. patent applications: Serial No. 628,447, filed November 14, 1945, entitled Toggle Springs, now Patent No. 2,571,170, patented October 16, 1951; Serial No. 635,956, filed December 19, 1945, entitled Snap Disc Springs, now Patent No. 2,604,316, patented July 22, 1952; and Serial No. 139,182, filed January 18, 1950, entitled Snap Disc Springs and Methods of Manufacture. According to those disclosures a snap disc may be made so that its snap movement in one direction may be initiated with comparative ease, whereas the return movement may require considerably greater force.

In the instant invention, the disc is preferably made so that it may be snapped out of its configuration as shown in full lines in Figs. 2 or 3 with an initiating thrust such as may be afforded by the output lever 25 of the amplifying linkage 13. Thus the snap spring disc in the illustrated embodiment is formed so that the successive trip-points thereof measured from any reference, such as the normal plane of the disc, do not vary more than ±0.001 inch or a total of 0.002 inch. A sensitivity or variation of only 2° is possible at the calibrated temperature level of the device. Accordingly, with the brass rod 17 partaking of an expansion movement of 0.0001 inch per degree Fahrenheit (the brass rod being approximately nine inches in length), and with a multiplying factor of ten provided by the levers 24 and 25, the center of the disc 35 will be displaced .001 inch per degree F. A change of 2 degrees in temperature of the water above the preestablished maximum will, therefore, initiate snapping of the disc.

The sensitivity of the unit may be adjusted within preestablished limits by adjusting the brass rod 19 lengthwise within the Invar sleeve 17, this being accomplished by turning the threaded tip 20 either to increase or decrease the pressure normally exerted against the disc 35.

The mechanism to be actuated by the snap movement of the disc 35 may be of any suitable type, with the preferred embodiment comprising an electrical switch assembly hereinafter described. The central bore 29b of the plate member 29 slidably receives a push-rod 37 formed with a retaining shoulder 38. The inner end of the rod 37 is adapted to be engaged by the moving portion of the disc 35 upon snapping into the second configuration of equilibrium as shown in broken lines.

Mounted within the dome of the cap member 30 is a movable carrier plate 39 formed of insulating material and centrally apertured to receive a push-button extension 37a formed on the end of the push-rod 37. The inner surface of the carrier plate 39 is engaged by the shoulder 38 of the push-rod 37 so that movement of the push-rod effects a corresponding movement of the plate. A pair of shorting arms 40, formed of electrically conducting material, are loosely secured at their centers to the under-side of the carrier plate 39 by means of rivets 41.

Each of the two shorting arms 40 carries a pair of contact elements 42 and 43, and two pairs of stationary contacts 44 and 45 are mounted in the plate 29 to be engaged by movable contacts 42 and 43 respectively. Conductor strips 46 and 47 (Fig. 1), are connected to the stationary contacts 44 and 45 respectively, and are furnished with suitable terminal screws 48 and 49 at their outer ends.

The carrier plate 39 is formed on its upper surface with a pair of bosses 50 and 51 over which are fitted compression springs 52 and 53 which react against the inner surface of the cap 30 to urge the carrier downwardly to close all contacts.

In operation, as the temperature of the surrounding medium in the tank is raised to the preestablished value, the brass rod 19 will expand and, through the levers 24 and 25, will snap the disc 35 to its second configuration of equilibrium. In so doing the push-rod 37 will be driven upwardly against the force of the coil springs 52 and 53 to open the normally-closed pairs of contacts 42—44 and 43—45. The characteristics of the disc 35 are such that it is able to maintain its second configuration of equilibrium against the action forces of the compressed springs 51 and 52.

In order to effect resetting of the thermostat after the water temperature within the tank has been lowered, the push-button extension 37a may be pressed by means of key or other suitable instrument through a convenient opening 54 in the cap member 30, thereby to drive the inner end of push-rod 37 against the snap disc 35 to initiate snapping movement in the reverse direction.

Numerous modifications may be provided in the above described thermostat without departing from the scope of the invention. Thus for example, various heat responsive devices may be utilized in place of the brass rod 19 and Invar sleeve 17, it being required only to revise the amplification factor of the motion-modifying linkage according to the characteristic of the heat responsive member used. If preferred the heat responsive element may be made to induce the resetting action of the device by providing a suitable driving connection therebetween. Likewise numerous modifications may be made in the design and characteristics of the electrical circuit actuated by snap movement of the disc 35. Accordingly, it will be apparent that the invention should not be limited in scope save as defined by the following claims.

We claim:

1. In a thermoresponsive device having thermal sensing means adapted to provide a limited output movement in response to a preestablished temperature differential, a housing having a first chamber formed therein, an axially movable shaft member extending into said chamber and having a shoulder formed thereon, movable plate means in the chamber having a central aperture to receive said shaft and engaging said shoulder, first and second spring means disposed on opposite sides of the axis of said shaft member reacting between said housing and said plate means, first and second pairs of stationary contacts mounted in said chamber, contact means on said plate means, said contact means being adapted to complete electrical circuits between each of said pairs of stationary contacts, a snap spring disc adapted to partake of snap movement between two configurations, annular abutment means for loosely confining said disc adjacent its periphery, said sensing means being adapted to engage the center portion of said disc to induce snap movement between said configurations, the inner end of said movable shaft member being spaced from the center of said disc in one of said configurations but disposed within the range of travel of the disc to the other configuration, thereby to be engaged and displaced by said disc after snap movement is initiated by said sensing means, the displacement of said movable shaft member being adapted to displace said plate means and contact means thereon to open the circuits between said stationary contacts.

2. A thermoresponsive device as set forth in claim 1, said movable plate means comprising a plate member of electrically insulated material, and a pair of arched electrically conducting arms carried by their respective centers by said plate member, said contact means being disposed at the free ends of said arms, whereby the electrical circuit between the respective pairs of stationary contacts is adapted to be completed through said arms.

3. A thermoresponsive device as set forth in claim 1, including a channel formed in said housing adjacent said movable shaft member affording access to the shaft member by means of which the shaft member may be manually actuated to cause the snap spring disc to reverse its configuration and to permit said first and second spring means to close the electrical circuits between the said pairs of stationary contacts.

JOHN B. CATALDO.
ALBERT N. COOK.

References Cited in the file of this patent

UNITED STATES PATENTS

| Number | Name | Date |
| --- | --- | --- |
| 1,865,219 | Spencer | June 28, 1932 |
| 1,874,660 | Vaughn | Aug. 30, 1932 |
| 1,939,285 | Spencer | Dec. 12, 1933 |
| 1,940,300 | Gerdien et al. | Dec. 19, 1933 |
| 2,221,907 | Bondurant | Nov. 19, 1940 |
| 2,235,186 | Wilkinson | Mar. 18, 1941 |
| 2,394,121 | Ulanet | Feb. 5, 1946 |
| 2,549,740 | Yonkers | Apr. 17, 1951 |

FOREIGN PATENTS

| Number | Country | Date |
| --- | --- | --- |
| 340,781 | Great Britain | Jan. 8, 1931 |